May 3, 1955
A. D. McRAE ET AL
2,707,560
SKIMMING APPARATUS
Filed Dec. 20, 1952
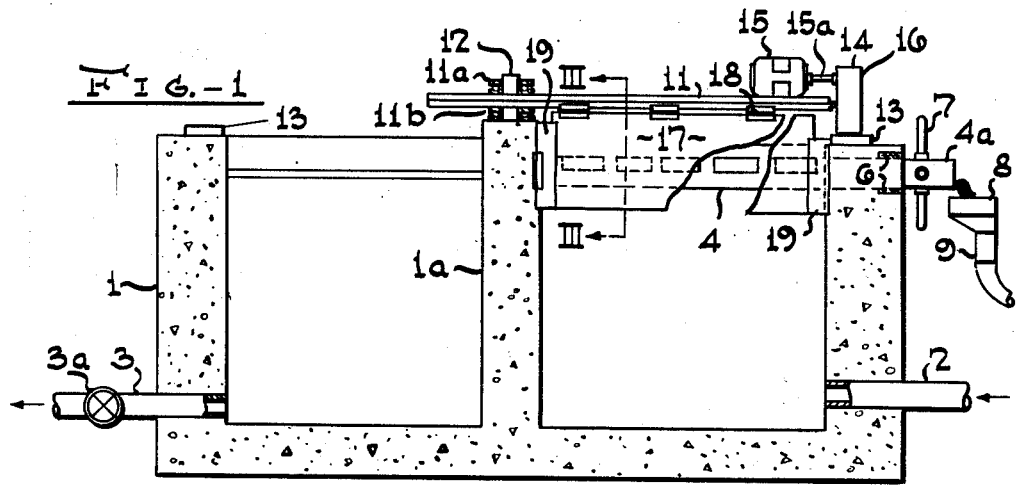
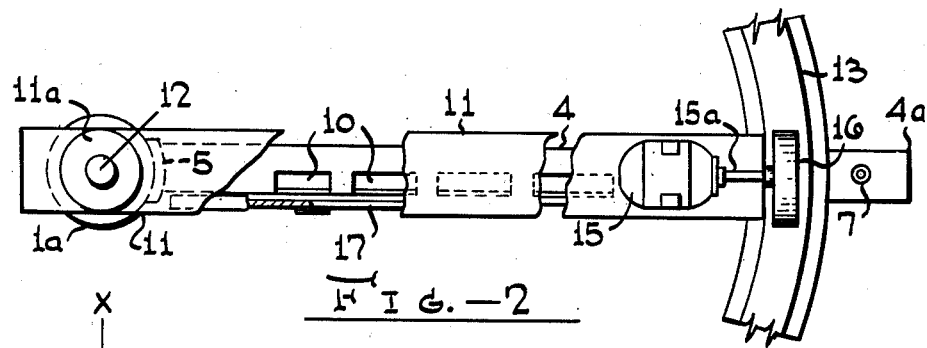
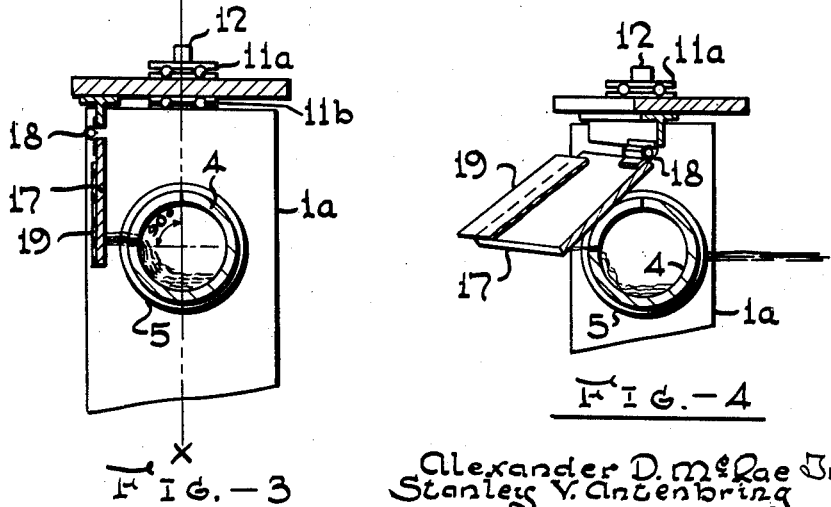
Alexander D. McRae Inventor
Stanley V. Antenbring
By George J. Hickey Attorney

United States Patent Office 2,707,560
Patented May 3, 1955

2,707,560

SKIMMING APPARATUS

Alexander D. McRae and Stanley V. Antenbring, Sarnia, Ontario, Canada, assignors to Esso Research and Engineering Company, a corporation of Delaware Application December 20, 1952, Serial No. 327,080

2 Claims. (Cl. 210—51)

The present invention relates to an apparatus for recovering the lighter of two substantially immiscible liquids of different specific gravities from a dispersion of the lighter liquid in the heavier, or from an emulsion in which the lighter liquid is present in a minor proportion. More particularly, the invention relates to the recovery of a lighter liquid separated from a heavier liquid by gravity separation, as from a dispersion or emulsion of such liquids, and where the separated lighter liquid is present as a supernatant layer on the surface of the body of the heavier liquid, with an intervening interface. The invention is particularly concerned with an apparatus for recovering a thin layer of a material such as oil, separated from and floating on the surface of a material of higher specific gravity, such as water.

In oil refinery operation, large volumes of waste water are derived from the various refinery equipment and processes. Naturally, this water contains quantities of oily material which, if discharged without treatment, not only would produce contamination in any sewage treatment through which it might be passed, but also, if discharged into any natural body of water navigable or otherwise, would produce an undesirable pollution problem. Also, while the quantity of oily materials may be small in proportion to the volume of water with which it is associated, in the aggregate a considerable amount of more or less valuable oil products may be lost if provision is not made for separation prior to discharge. It is conventional practice to pass refinery waste water through some sort of separating apparatus. Ordinarily the relative volumes of separated oil and water will be such that the separated oil will form a comparatively thin film thereof on the surface of the water. Due to the thinness of this surface film, difficulty is frequently experienced in the removal and recovery of the oily material.

It is an object of the present invention to provide a means whereby the surface film of oil may be substantially concentrated recurrently and caused to be discharged into a collection trough therefor. It is also an object of the invention to provide such apparatus in which provision is made for adjusting operation of the apparatus to the thinness of the film or surface layer of oil. It is a further object of the invention to provide a separator apparatus including a tank or vessel for gravity separation of oily materials from an aqueous carrier liquid, in which the oil forms a film or supernatant layer on the carrier liquid, and a skimming means which facilitates recovery of the film or layer by concentration and movement of the oil film or layer and surface displacement thereof into a receiver or collector trough.

The invention and its objects may be more fully understood from the following description when read in conjunction with the accompanying drawing, in which, Fig. 1 is a vertical section through a separating chamber of the character contemplated according to the present invention and showing the skimming apparatus in side elevation with parts broken away, Fig. 2 is a plan view of a portion of the apparatus as shown in Fig. 1 with parts broken away, Fig. 3 is a vertical section through a portion of the apparatus as shown in Fig. 1, taken along the line III—III thereof, and Fig. 4 is a similar view showing an operating characteristic of the apparatus contemplated.

Referring more particularly to the drawings, the numeral 1 designates a cylindrical separating tank or chamber. As shown, the tank is provided with a coaxially disposed support post or column 1a. The tank is also provided with an inlet 2 for a dispersion of a low gravity liquid in a liquid of higher gravity, as for example oil in water, and an outlet 3 for the higher gravity liquid. As shown, the outlet 3 is provided with a valve 3a which is adjustable to maintain any desired head of liquid in the chamber 1. The head of liquid may be automatically maintained by the use of a pressure responsive valve or by other means, such as a weir.

An outlet for the low gravity liquid is provided by means of a collector pipe 4, supported at its inner end by a trunnion 5, on center post 1a, and extending radially of the tank through the outer wall. As shown, the pipe 4 is sealed with relation to the outer wall, as by means of a stuffing box seal 6. The pipe 4 is rotatable in the trunnion 5 and the seal 6, being provided with means such as handles 7 or other suitable means for this purpose. The outer end 4a of the pipe 4 may be connected to any desired conduit system for handling the discharge therefrom. As shown, the outer end 4a of the pipe 4 is arranged to discharge directly into a catch basin 8 having a withdrawal conduit connection 9. Between the trunnion bearing and the wall of the tank 1, the pipe 4 is provided with a series of longitudinally spaced inlet passageways 10 opening through the wall of the pipe. These passageways are shown as formed by the removal of a series of 90° sections from the wall of the pipe.

In conjunction with the collector pipe, the separator tank is provided with a rotatable skimmer mechanism which concentrates a supernatant layer of the low gravity liquid, while moving it toward the inlet passageways provided in the pipe 4. The mechanism as illustrated comprises skimmer or sweep arm 11 pivoted at its inner end by means such as spud shaft 12 carried by the column or post 1a. Suitable shaft and support bearings 11a and 11b may be provided to facilitate rotation of the arm 11 about the shaft 12. The shaft 11 extends radially from the central post toward the outer wall of the chamber with the outer end of the shaft supported thereon. The support for the outer end of the shaft may be any suitable support such as the track member 13 which is adapted to receive a wheel 14 in which the arm 11 is mounted as by means of an axle secured to the arm at one end. Means for rotating the arm 11 is provided by the motor 15 mounted on the arm. The motor shaft 15a carries a spur gear 16 which engages a ring gear within the wheel rim. Other comparable means may be provided for rotating the shaft as desired or convenient.

Between the central post 1a and the wall of the tank 1, the arm 11 carries a skimmer blade 17. This blade is secured to the arm 11 along one longitudinal edge portion for hinged movement relative thereto as by means of hinges 18. The blade 17 depends vertically downward from the arm 11, and the hinge supports 18, to a depth at which the lower edge of the blade, when at rest, will be below the central axis of the pipe 4. Normally, the lower edge of the blade need not extend beyond the level of the lowermost surface portion of the pipe 4.

If desired, the ends of the blade 17 may be provided with extension pieces 19 formed of a flexible and deformable material mounted and disposed so as to provide a substantially liquid-tight seal between the ends of the blade and the adjoining surfaces of the wall 1 and the center post 1a.

As shown particularly in Figures 2 and 3, the blade 17 is mounted on the arm 11 in offset relation to the center line of the arm and the shaft 12. When thus mounted, rotation of the arm 11 will bring the blade into substantially parallel relationship to the pipe 4 when the center line of the arm is coincident with a vertical plane X—X passed through the center line of the pipe 4, thus insuring substantially complete discharge of the concentrated and supernatant layer of the lower gravity liquid accumulated ahead of the blade during rotation of the arm. Also, although not specifically illustrated by the drawings, it is contemplated that under certain circumstances the arm 11 may be extended so as to span the tank 1 diametrically thereof and, that under such circumstance a second blade may be provided to depend from the radially opposed portion of the extended arm.

In operation of the apparatus shown and described, the dispersion or mixture of liquids is introduced into the separator tank 1 by way of the line 2. The lighter liquid is separated by gravity in tank 1, and forms a substantially supernatant layer thereof on a body of the liquid of higher gravity. By means of the valve 3 or equivalent means, the level of liquids in the tank may be maintained so that the interface between the heavier liquid and the supernatant layer of lighter liquid is substantially coincident with the level of the axis of pipe 4, the pipe 4 being rotated so as to dispose the lower edge of inlet passageways 10 at substantially the same level. The motor 15 is then operated so as to rotate the arm 11 about the central axis provided by the spud shaft 12 and toward the inlet passageways 10. In the apparatus element illustrated by the drawings, the direction of rotation is counterclockwise, but obviously the apparatus may be designed for clockwise operation if desired. As the skimmer arm and the dependent skimmer blade are rotated, the blade 17 which extends downwardly through the supernatant layer of a lighter liquid, and the interface, tends to sweep this layer between itself and the collector pipe, forcing the supernatant layer of lighter liquid to overflow the lower edge of the passageways 10 into the pipe 4. In this operation the lower edge of each of the passageways 10 acts as an overflow weir, which may be adjusted so as to prevent entrance of the heavier liquid into the pipe 4. Any surface head of the heavier liquid which may tend to be created by motion of the skimmer blade 17 is substantially released under the lower edge of the blade or the lowermost surface of the pipe 4. Due to the fact that the blade extends downwardly through the interfacial level, the surface level of the lighter liquid has no real means of escape except through the inlet passageways 10 of the pipe 4. The lighter liquid discharged into the pipe 4 through passageways 10 by rotation of the skimmer blade is removed therefrom by way of the catch basin 8 and the conduit connection 9. The level of the lower edge of the inlet passageways 10 may, of course, be adjusted by rotation of the pipe 4 through an arc of approximately 180° in order to compensate for minor variations in the interfacial level within the operating range of a level control means such as the valve 3a. The measured distance within which such compensation may be provided will, of course, depend upon and be substantially equal to the diameter of the collector pipe employed.

The operating characteristic of the hinged skimmer blade 17 is more particularly illustrated in Fig. 4. As the arm 11 and blade 17 are rotated, upon contact of the blade with the pipe 4, the hinged joint between the blade and the arm permits the blade to pass over the pipe and to reassume its normally vertical position thereafter.

What is claimed is:

1. An apparatus for removing the liquid of lower specific gravity from a dispersion thereof in a liquid of higher specific gravity substantially immiscible therewith, comprising a circular separator tank a vertical pedestal support member disposed coaxially of said tank a collector pipe disposed radially of said tank, said pipe having an inner end and an outer end, and a plurality of inlet passageways longitudinally thereof opening into said pipe, a trunnion mount for the inner end of said pipe carried by said pedestal support peripherally thereof, the outer end of said pipe being supported in the tank wall and extended outwardly therethrough a skimmer arm extended radially of said tank in a plane above and in vertically spaced, substantially parallel relation to said collector pipe, said arm having an inner end, a pivot mount for the inner end of said skimmer arm carried by said pedestal support at the upper end thereof and coaxially therewith a skimmer blade substantially coextensive with said arm and mounted thereon in hinged relation thereto, said blade extending downwardly from said arm to a level substantially below the longitudinal axis of said collector pipe, a means for rotating said arm and blade about the vertical axis of said tank and said pedestal support, and a means for rotating said pipe about its longitudinal axis.

2. An apparatus for removing the liquid of lower specific gravity from a dispersion thereof in a liquid of higher specific gravity and substantially immiscible therewith, comprising a circular separator tank for gravity separation of said liquids, in which said lower gravity liquid is accumulated as a supernatant layer with an interface between said liquids, means for introducing said dispersion of liquids into said tank and for removing the higher gravity liquid therefrom so as to maintain a substantially constant volume of liquids in said tank and for removing the higher gravity liquid therefrom so as to maintain a substantially constant volume of liquids in said tank, a support member disposed coaxially of said tank, a collector pipe for said supernatant lower gravity liquid, said pipe having an inner end and an outer end, a trunnion mount for the inner end carried by said support member, said pipe extending therefrom radially of said tank through said tank wall at its outer end, a packing gland in said wall sealing the outer end of said pipe therein, a plurality of inlet passageways in the pipe wall, means for rotating said pipe in said gland and trunnion mount, a skimmer arm having an inner end carried by said support member and an outer end supported on said tank wall, said arm extending radially of the tank and disposed above said collector pipe in vertically spaced relation thereto, a skimmer blade substantially coextensive with said arm secured thereto in hinged relation along a longitudinal edge portion and dependent therefrom with its opposed edge portion extending below the horizontal center line of said pipe, seal means carried at opposite ends of said blade in contact respectively with said tank wall and said coaxial support, and means for rotating said skimmer arm about said coaxial support toward said pipe inlet passageways.

References Cited in the file of this patent

UNITED STATES PATENTS

| 1,662,702 | Hebden | Mar. 13, 1928 |
| 2,155,960 | Thomas | Apr. 25, 1939 |
| 2,242,139 | Munroe | May 13, 1941 |
| 2,253,500 | Arango | Aug. 26, 1941 |
| 2,455,338 | Lind | Nov. 30, 1948 |
| 2,611,489 | Scott | Sept. 23, 1952 |

FOREIGN PATENTS

| 471,461 | Great Britain | Sept. 6, 1937 |